(12) United States Patent
Lee

(10) Patent No.: US 12,367,091 B2
(45) Date of Patent: Jul. 22, 2025

(54) ERROR LOG LIST AND ALARM SERVICE PLATFORM AND SYSTEM FOR SUPPORTING THE SAME

(71) Applicant: SUN HST Co., Ltd., Ulsan (KR)

(72) Inventor: Jin Yong Lee, Ulsan (KR)

( * ) Notice: Subject to any disclaimer, the term of this patent is extended or adjusted under 35 U.S.C. 154(b) by 367 days.

(21) Appl. No.: 17/861,338

(22) Filed: Jul. 11, 2022

(65) Prior Publication Data

US 2023/0016426 A1 Jan. 19, 2023

(30) Foreign Application Priority Data

Jul. 13, 2021 (KR) .......................... 10-2021-0091756

(51) Int. Cl.
*G06F 11/07* (2006.01)
*G05B 19/042* (2006.01)
*G05B 19/05* (2006.01)
*G05B 23/02* (2006.01)

(52) U.S. Cl.
CPC ...... *G06F 11/0772* (2013.01); *G05B 19/0428* (2013.01); *G05B 19/05* (2013.01); *G05B 23/027* (2013.01); *G05B 23/0272* (2013.01); *G06F 11/0784* (2013.01)

(58) Field of Classification Search
None
See application file for complete search history.

(56) References Cited

U.S. PATENT DOCUMENTS

| 10,019,303 | B2* | 7/2018 | Uhde | G06F 11/0772 |
| 2012/0116542 | A1* | 5/2012 | Vetter | G05B 23/0272 |
| | | | | 700/9 |
| 2016/0170686 | A1* | 6/2016 | Haas | G06F 3/121 |
| | | | | 358/1.14 |
| 2017/0236071 | A1* | 8/2017 | Walker | G08B 21/187 |
| | | | | 706/11 |
| 2017/0250883 | A1* | 8/2017 | Sawada | H04L 43/04 |

FOREIGN PATENT DOCUMENTS

| CN | 111597095 A * | 8/2020 |
| EP | 2924575 | 9/2015 |
| EP | 3680740 A1 | 7/2020 |
| KR | 10-1411370 | 6/2014 |

(Continued)

OTHER PUBLICATIONS

"ClearSCADA System Integration Training Notes", Jul. 2010, Control Microsystems, PP sec 3.2, 18 (Year: 2010).*

(Continued)

*Primary Examiner* — David Earl Ogg
(74) *Attorney, Agent, or Firm* — ANTONIO HA & U.S. PATENT, LLC

(57) ABSTRACT

According to an embodiment, an error log list and alarm service system comprises an execution terminal receiving an alarm including error information according to an operation error in a machine facility designated through an error log list and alarm service platform and a monitoring server collecting a result of monitoring an operation state and operation error in the machine facility, extracting the error information according to an information setting value set by the execution terminal, and providing the extracted error information through a web or app platform.

8 Claims, 9 Drawing Sheets

(56) References Cited

FOREIGN PATENT DOCUMENTS

| | | | |
|---|---|---|---|
| KR | 10-2017-0117814 | | 10/2017 |
| KR | 10-2018-0002225 | | 1/2018 |
| KR | 20180002225 A | * | 1/2018 |
| KR | 20190043879 A | * | 4/2019 |
| KR | 10-2079748 | | 2/2020 |
| KR | 10-2021-0059154 | | 5/2021 |
| KR | 10-2271547 | | 7/2021 |

OTHER PUBLICATIONS

ReLab, "ClearView-SCADA Manual", 2017, ReLab Software LLC, pp. 20, 47, 53-54, 67-85, 197-202 (Year: 2017).*
English Specification of 10-2018-0002225.
English Specification of 10-2017-0117814.
English Specification of 10-2079748.
English Specification of 10-1411370.
English Specification of 10-2021-0059154.
English Specification of 10-2271547.
English Specification of EP3680740A1.

* cited by examiner

ERROR LOG LIST AND ALARM SERVICE PLATFORM AND SYSTEM FOR SUPPORTING THE SAME

CROSS-REFERENCE TO RELATED APPLICATION

This application is based on and claims priority under 35 U.S.C. 119 to Korean Patent Application No. 10-2021-0091756, filed on Jul. 13, 2021, in the Korean Intellectual Property Office, the disclosure of which is herein incorporated by reference in its entirety.

TECHNICAL FIELD

The disclosure relates to an error log list and alarm service platform and a system for supporting the same.

DESCRIPTION OF RELATED ART

There are countless machines and equipment in car manufacturing sites. These machines and equipment require periodic maintenance and a quick response to their breakdown or stop to reduce loss.

Conventionally, a failure or an error in a machine is indicated simply by red light or siren.

Such conventional way is incapable of quick response and accelerates loss.

SUMMARY

According to an embodiment, there is provided an error log list and alarm service platform and a system for supporting the same to address the issues with the conventional art.

According to an embodiment, an error log list and alarm service system comprises an execution terminal receiving an alarm including error information according to an operation error in a machine facility designated through an error log list and alarm service platform and a monitoring server collecting a result of monitoring an operation state and operation error in the machine facility, extracting the error information according to an information setting value set by the execution terminal, and providing the extracted error information through a web or app platform.

The error log list and alarm service system may further comprise a measuring module collecting state information and environment information according to operation of components from a programmable logic controller (PLC) interworking with or included in the machine facility and transmitting the collected information to the monitoring server.

The monitoring server may provide the execution terminal with an error list including a facility number of the machine facility equipped with the measuring module, component information about the machine facility with an error, and a number of errors, and update information about the error list.

The monitoring server, when the error information included in the error list matches the information setting value set by the execution terminal, may send an alarm text to the execution terminal or a terminal designated by a manager.

The monitoring server may analyze a correlation between error items in the error list, displays an error weight as high, medium, and low, analyzes an error type and an error frequency according to the error weight and the number of errors to adjust a maintenance term, and provide an analysis result to the execution terminal.

The monitoring server, when an interval between an nth error occurrence time and an n+1th error occurrence time is two times or more shorter than an interval between an n−1th error occurrence time and the nth error occurrence time, may send an emergency alarm text to the execution terminal or a terminal designated by a manager.

The monitoring server, if an operation error occurs in a first component or a first machine facility, analyzes an operation state of at least one second component or second machine facility associated with the operation of the first component or first machine facility, may analyze an operation period during which the second component or second machine facility operates abnormally slow or fast in the operation state to thereby analyze causality with the operation error in the first component or first machine facility.

The monitoring server may provide information obtained by treating an error occurrence time and number of errors in the machine facility with the error, with a log function and a fractal dimension function.

The error log list and alarm service platform may include an interface for designating at least one machine facility to be monitored for an error, log, or possibility, an interface for setting an error occurrence range for each of the at least one machine facility, an interface for setting to send an alarm text at a designated number when a designated machine facility meets the error occurrence range, an interface for displaying an error log of the at least one machine facility through an error occurrence time and number of errors through a log function and a fractal dimension function, and an interface for editing and outputting the error log in a preset file format.

According to an embodiment, use of the error log list and alarm service platform 10 and the system supporting the same enables real-time provision of an alarm message to the user, allowing for a quick response to any error or issue occurring in the machine facility.

Further, the embodiment of the disclosure may store and analyze the error list to thereby calculate a proper maintenance period and easily grasp the type of error, frequency of each type of error, and the type of error for each period.

The embodiment of the disclosure may also classify errors of interest and errors of no interest, selectively providing or receiving the presence or absence of only errors designated by the user.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
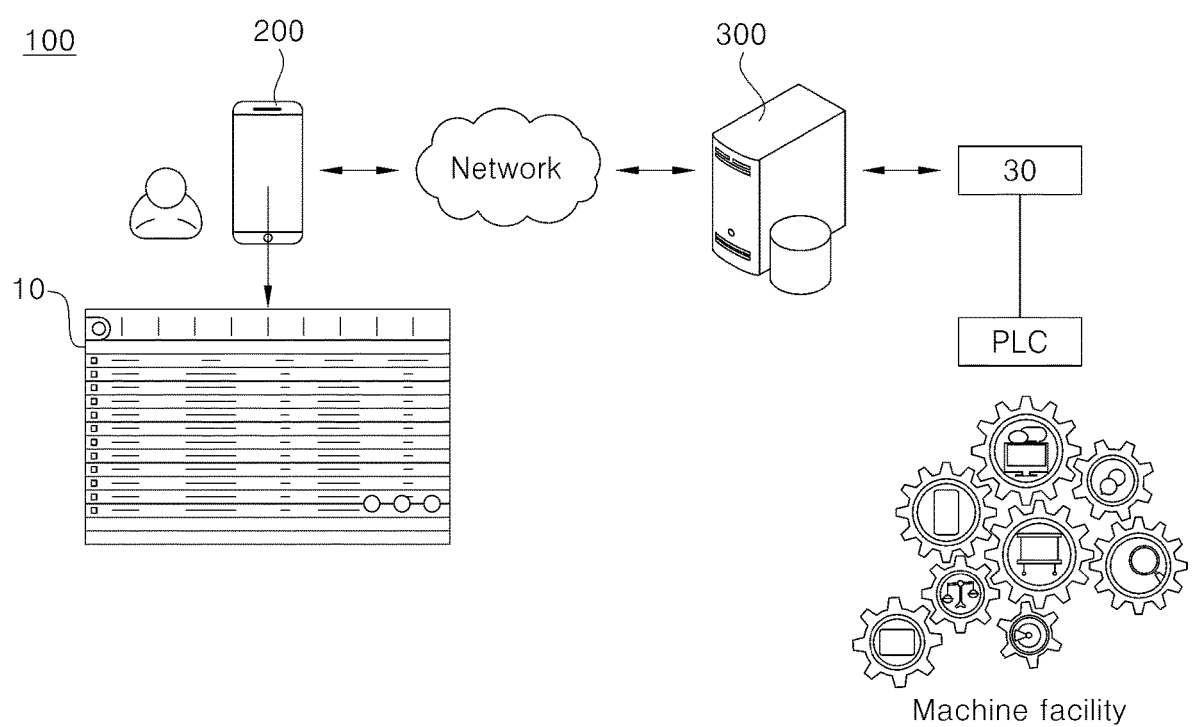
FIG. 1 is a view illustrating a network configuration of an error log list and alarm service system according to an embodiment.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings. As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Hereinafter, an error log list and alarm service system and method according to embodiments of the disclosure are described in detail with reference to the drawings.

Figure 2:
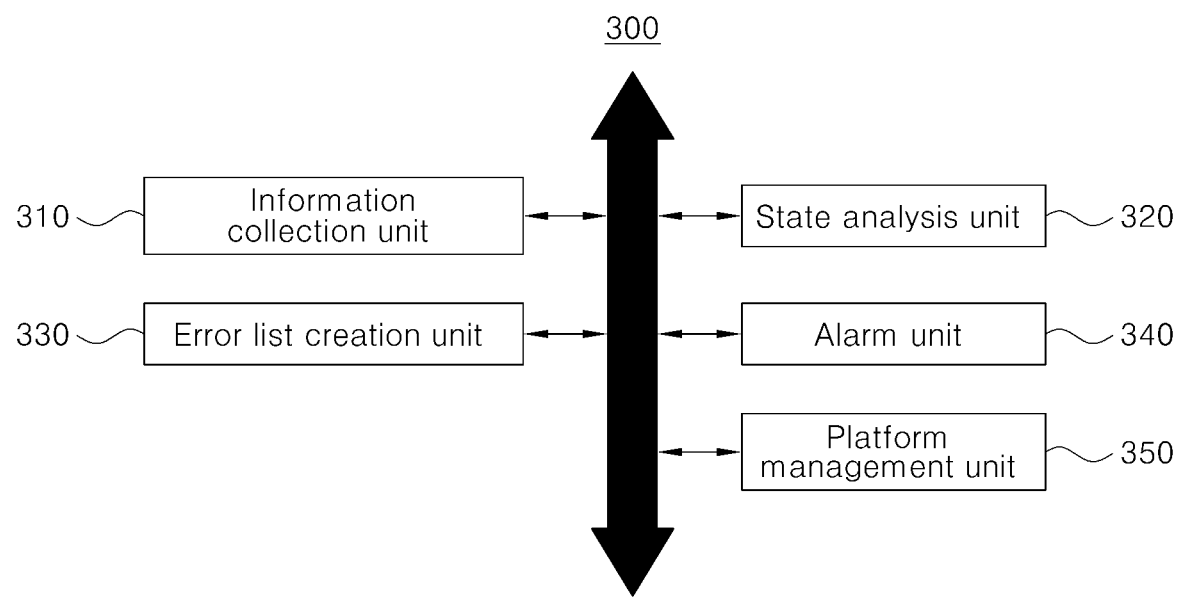
FIG. 2 is a view illustrating a detailed configuration of the monitoring server of FIG. 1.
Figure 3:
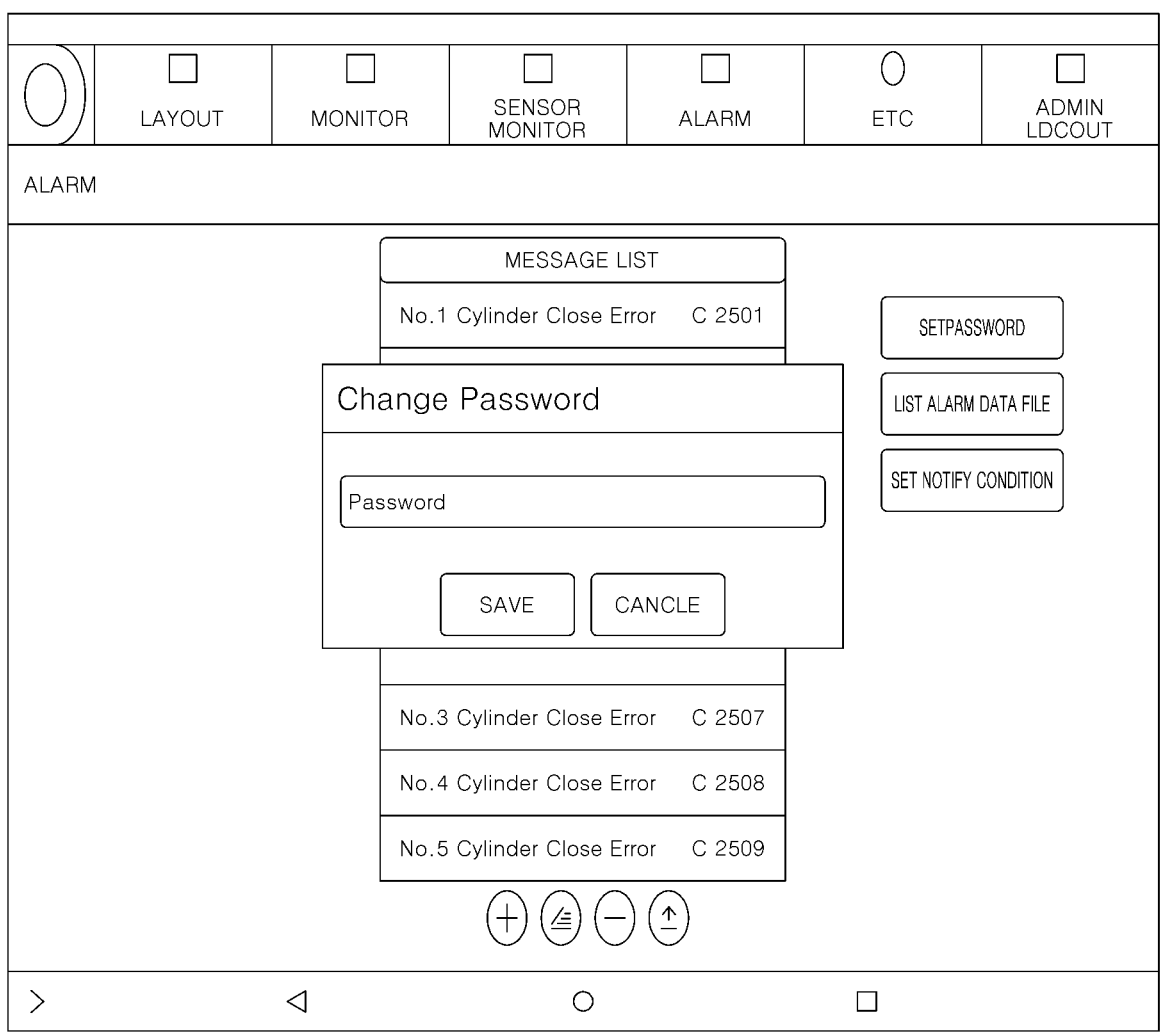
FIGS. 3 and 4 are example screenshots of an execution screen of an error log list and alarm service platform, executed on the execution terminal of FIG. 1.
Figure 4:
Figure 5:
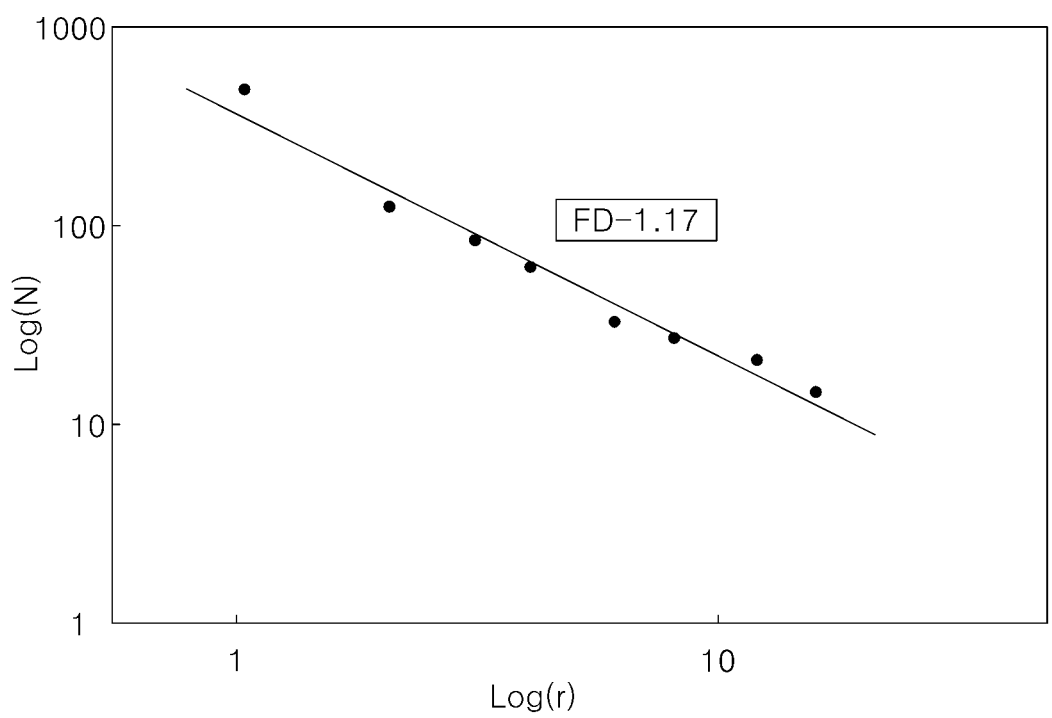
FIGS. 5 and 6 are views illustrating example chart information in which an error occurrence time and number of errors in a facility are processed with a log function and a fractal dimension function.
Figure 6:
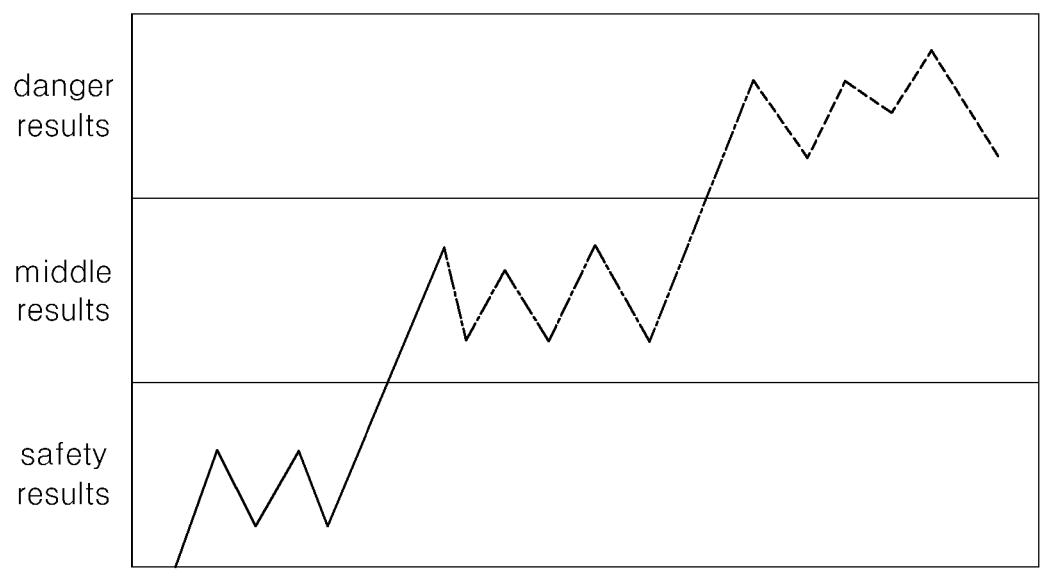

FIG. 1 is a view illustrating a network configuration of an error log list and alarm service system according to an embodiment. FIG. 2 is a view illustrating a detailed configuration of the monitoring server of FIG. 1. FIGS. 3 and 4 are example screenshots of an execution screen of an error log list and alarm service platform, executed on the execution terminal of FIG. 1. FIGS. 5 and 6 are views illustrating example chart information in which an error occurrence time and number of errors in a facility are processed with a log function and a fractal dimension function.

Referring to FIG. 1, according to an embodiment, a system 100 supporting an error log list and alarm service platform includes an execution terminal 200 and a monitoring server 300. The system 100 may further include a measuring module 30 that gathers environment information and state information according to the operations of components from a programmable logic controller (PLC) interworking with a machine facility (e.g., an alternating current (AC) facility) and transmits the gathered information to the monitoring server 300. The measuring module 30 may detect the difference between the ground resistance of the machine facility (e.g., an AC facility) and a reference resistance (e.g., a set resistance). When the facility to be measured is an AC facility, the measuring module 30 may detect the applied voltage (AC) of the AC facility and the safety and leakage voltage on a reference point of the applied voltage (AC).

When the machine facility is a direct current (DC) facility, the measuring module 30 may detect the applied voltage of the DC facility and the safety and leakage voltage on a reference point of the applied voltage (DC).

The measuring module 30 may also create and provide a log file for the detected AC voltage and DC voltage values.

The execution terminal 200 and the monitoring server 300 may communicate with each other through a network. The network may mean a connecting structure to enable exchanging of information between nodes, such as a plurality of terminals and servers. Examples of such network may include, but are not limited to, a 3rd Generation Partnership Project (3GPP) network, a Long Term Evolution (LTE) network, a Long Term Evolution-Advanced (LTE-A) network, a 5th Generation Partnership Project (5GPP) network, a World Interoperability for Microwave Access (WIMAX) network, an Internet network, a Local Area Network (LAN) network, a Wireless LAN network, a Wide Area Network (WAN) network, a Personal Area Network (PAN) network, a Bluetooth network, an NFC network, a satellite broadcast network, an analog broadcast network, and a Digital Multimedia Broadcasting (DMB) network.

As used herein, the singular forms "a," "an," and "the" are intended to include the plural forms as well, unless the context clearly indicates otherwise. According to embodiments, a plurality of components of the same type may be a single component of the type, and one component may add one or more components of the same type.

The execution terminal 200 may access the monitoring server 300 through an error log list and alarm service platform 10 and may receive, store, and edit error logs, error lists, and alarm information according to errors, of the machine facility monitored by the monitoring server 300.

The error log list and alarm service platform 10 may include at least one interface supporting various functions to be described below.

For example, the error log list and alarm service platform 10 includes a first interface that indicates the presence or absence of an error and error log and at least one machine facility to be monitored.

The first interface displays the facility number of the machine facility equipped with a measuring module and component information about the machine facility and check boxes for designation.

The error log list and alarm service platform 10 includes a second interface for setting an error occurrence range for each of at least one machine facility.

The error log list and alarm service platform 10 includes a third interface for setting alarm text at a designated number when a designated machine facility meets the error occurrence range.

The error log list and alarm service platform 10 includes a fourth interface that displays the error logs through error occurrence times and the number of errors through a log function and a fractal dimension function, for at least one machine facility.

The error log list and alarm service platform 10 includes a fifth interface for editing and outputting the error log in a preset file format.

The error log list and alarm service platform 10 which is executed on the execution terminal 200 may provide different functions depending on the type of the user (e.g., user or manager) authorized to use by the monitoring server 300.

The execution terminal 200 may be a terminal executing the error log list and alarm service platform 10 and may be one of various terminals or devices, such as smartphones, portable terminals, mobile terminals, foldable terminals, personal digital assistants (PDAs), portable multimedia players (PMPs), telematics terminals, navigation terminals, personal computers, laptop computers, slate PCs, tablet PCs, Ultrabook computers, wearable devices, such as smartwatches, smart glasses, head-mounted displays, etc., Wibro terminals, Internet protocol television (IPTV) terminals, smart TVs, digital broadcast terminals, audio video navigation (AVN) terminals, audio/video (A/V) systems, flexible terminals, or digital signage devices.

The execution terminal 200 forms a communication connection with any internal component or at least one external terminal (e.g., camcorder or console controller) via a wired/wireless communication network. Wireless Internet technology which may be adopted for transmission over the wireless communication network may include at least one of wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long-term evolution (LTE), LTE-advanced (LTE-A), LTE V2X (C'V2X), wireless mobile broadband service (WMBS), or 5G communication. The execution terminal 200 may transmit or receive data according to at least one wireless Internet technology which may include not only the above-enumerated techniques but also other non-mentioned Internet techniques. Short-range communication techniques that may be adopted according to an embodiment may include Bluetooth, radio frequency identification (RFID), infrared data association (IrDA), ultra-wideband (UWB), ZigBee, near-field communication (NFC), ultrasound communication (USC), visible light communication (VLC), Wi-Fi, or Wi-Fi direct. Wired communication techniques that may be adopted according to an embodiment may include power line communication (PLC), universal serial bus (USB) communication, Ethernet, serial communication, or optical/coaxial cable communication.

The execution terminal 200 may communicate information or data with any terminal via a USB.

The execution terminal 200 transmits or receives wireless signals to/from a base station over a mobile communication network established as per mobile communication standards, protocols, or schemes, such as global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A).

The monitoring server 300 may be a component that monitors the operation state and operation errors in the machine facility designated by the execution terminal 200.

The monitoring server 300 may gather monitoring result information, extract error information according to an information setting value set by the execution terminal 200, and provide the error information through web or app platform.

The monitoring server 300 may provide the execution terminal 200 with an error list including the facility number of the facility equipped with the measuring module 30, component information about the facility that has an error, and the number of errors, and update information about the error list.

When the error information included in the error list matches the information setting value set by the execution terminal 200, the monitoring server 300 may send alarm text to the execution terminal 200 or at the number of a terminal designated by the manager (e.g., the manager's phone number).

The monitoring server 300 may analyze the correlation between error items in the error list, display error weights as high, medium, and low, analyze error types and error frequencies according to the error weights and the number of errors to adjust the maintenance term, and provide the analysis results to the execution terminal 200.

When the interval between an nth error occurrence time and an n+1th error occurrence time is two times or more shorter than the interval between an n−1th error occurrence time and the nth error occurrence time, the monitoring server 300 may send an emergency alarm text to the execution terminal 200 or at the number of the terminal designated by the manager.

If an operation error occurs in a first component or a first machine facility, the monitoring server 300 may analyze the operation state of at least one second component or second machine facility associated with the operation of the first component or first machine facility, analyze an operation period (time) during which the second component or second machine facility operates abnormally slow or fast in their operation state to thereby analyze the causality with the operation error in the first component or first machine facility.

The monitoring server 300 may provide information obtained by processing (or treating) the error occurrence time and the number of errors, in the corresponding facility with the errors, with a log function and a fractal dimension function.

More specifically, the monitoring server 300 may include an information collection unit 310, a state analysis unit 320, an error list creation unit 330, an alarm unit 340, and a platform management unit 350.

The information collection unit 310 may collect environment information about the machine facility, component specifications, operation state information for each component or for each mode, error occurrence time according to the time, and number of errors, from the measuring module connected with the PLC of the machine facility.

The information collection unit 310 may also collect information configuration information set by the execution terminal 200. The information configuration information may include the type (or type number) of the machine facility to be monitored by the execution terminal 200, components, error types, and error occurrence ranges or configuration information thereabout.

The information collection unit 310 may include fields or elements to be implemented to be suited for the purpose of the disclosure using a relational database management system (RDBMS), such as Oracle, MYSQL, MSSQL, Infomix, Sybase, or DB2, an object-oriented database management system (OODBMS), such as Gemston, Orion, or O2, and an XML native database, such as Excelon, Tamino, or Sekaiju. Each field or element may be formed of a superordinate concept, or subordinate concept, or field or element.

The state analysis unit 320 analyzes component information about the facility with an error(s), error occurrence time, and number of errors, based on the state information about the machine facility collected by the information collection unit 310.

The state analysis unit 320 may analyze the correlation between error items in the error list created by the error list creation unit 330, analyze error weights as high, medium, and low, analyze the error type and error frequency according to the error weight and number of errors to adjust the maintenance period, and provide analysis results.

The state analysis unit 320 analyzes a ratio of the interval between the nth error occurrence time and the n+1th error occurrence time to the interval between the n−1th error occurrence time and the nth error occurrence time.

If an operation error occurs in a first component or a first machine facility, the state analysis unit 320 may analyze the operation state of at least one second component or second machine facility associated with the operation of the first component or first machine facility, analyze an operation period (time) during which the second component or second machine facility operates abnormally slow or fast in their operation state to thereby analyze the causality with the operation error in the first component or first machine facility.

The state analysis unit 320 may compare the ground resistance and applied voltage (AC or DC) in the log file transmitted from the measuring module 30 with reference setting values for the target facility to be measured, and if the measured value exceeds the reference setting value (e.g., a threshold or a limit), detect a window area for the exceeding time period.

When the value measured by the measuring module 30 falls outside the limit of the reference setting value, the state analysis unit 320 provides a stop operation event to the PLC of the AC or DC facility or a manufacturing execution system (MES) through the alarm unit 340.

The state analysis unit 320 also provides user interfaces (UI) including a setting interface for setting the ground resistance limit and applied voltage limit for the machine facility and a graphic interface for displaying, in graph, the limit set on the setting interface and the log file information.

The error list creation unit 330 may create a list of error contexts for each operation mode and for each component of the machine facility analyzed by the state analysis unit 320.

The error list creation unit 330 may also create an error list including chart information obtained by processing the error occurrence times in the facility with errors and the number of errors with a log function and a fractal dimension function.

The error list creation unit 330 may also provide an edit interface for editing (modifying, deleting, or updating) the error list to the execution terminal 200.

The alarm unit 340 may send an alert or warning alarm to the execution terminal 200 and/or at a number (e.g., a phone number) designated by the execution terminal 200 if the error caused in the designated machine facility meets an error condition designated by the user.

The platform management unit 350 may provide the error log list and alarm service platform 10 to the execution terminal 200.

The error log list and alarm service platform 10 may include an application, program, and/or webpage installed and/or driven on the execution terminal 200.

Here, the web browser may be a program or application that enables use of world wide web (WWW) services or that receives and shows hypertext written in the hypertext mark-up language (HTML), and the web browser may include, e.g., Netscape, Explorer, or Chrome.

The term "application" may mean an application executed on the terminal, and the application may include, e.g., an app running on a mobile terminal, e.g., a smartphone. The app may be downloaded and installed from an application market which is a virtual market where mobile contents may freely be sold or bought.

The error log list and alarm service platform 10 may include an interface that indicates the presence or absence of an error and error log and at least one machine facility to be monitored, an interface for setting an error occurrence range for each of at least one machine facility, an interface for setting alarm text at a designated number when a designated machine facility meets the error occurrence range, an interface that displays the error logs through error occurrence times and the number of errors through a log function and a fractal dimension function, for at least one machine facility, and an interface for editing and outputting the error log in a preset file format.

Figure 7:
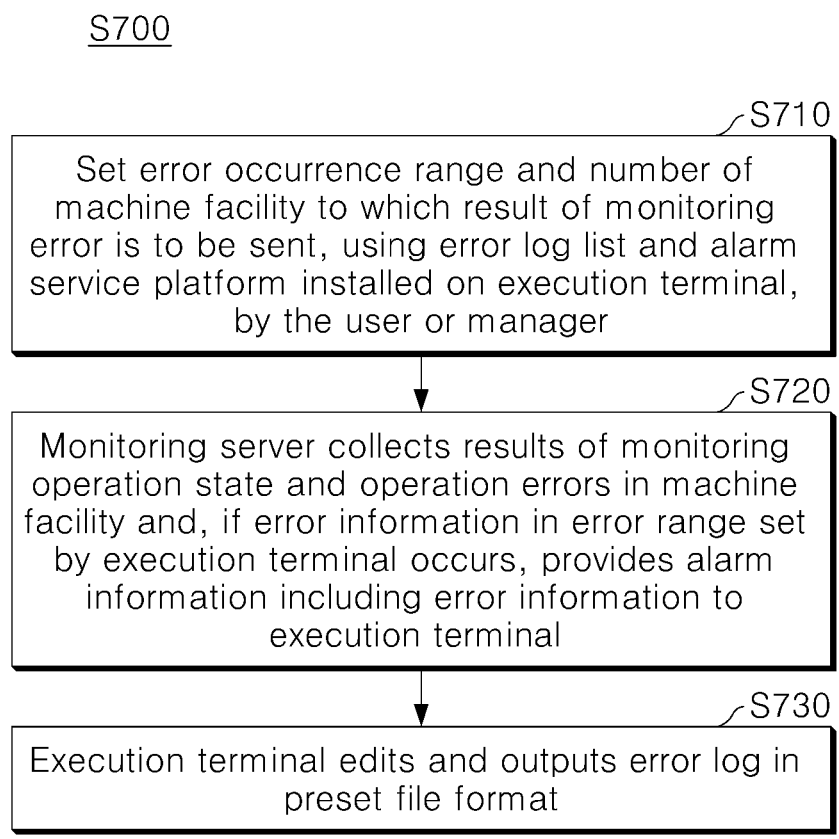
FIG. 7 is a flowchart illustrating an error log list and alarm service method according to an embodiment.
Figure 8:
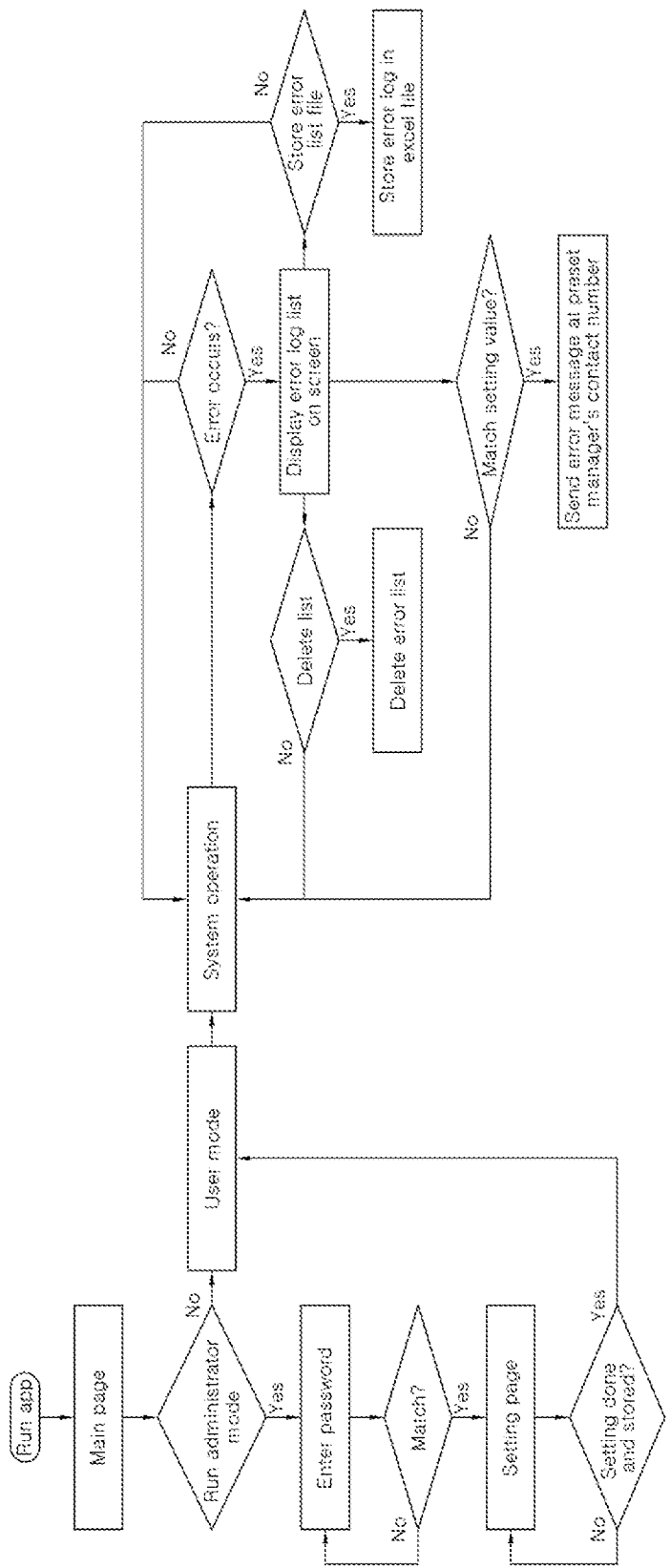
FIG. 8 is a view illustrating operations of an execution terminal according to an embodiment.

FIG. 7 is a flowchart illustrating an error log list and alarm service method according to an embodiment; FIG. 8 is a view illustrating operations of an execution terminal according to an embodiment.

Referring to FIGS. 7 and 8, according to an embodiment, an error log list and alarm service method S700 sets an error occurrence range and the number of the machine facility to which a result of monitoring an error is to be sent, using the error log list and alarm service platform 10 installed on the execution terminal 200, by the user or manager (S710).

The error occurrence range may be information including the error occurrence time, number of errors, error type, and error frequency.

Thereafter, the monitoring server 300 collects the results of monitoring the operation state and operation errors in the machine facility and, if error information in the error range set by the execution terminal 200 occurs, provides alarm information including the error information to the execution terminal 200 (S720).

The execution terminal 200 may receive the error list including the number of the facility equipped with the measuring module, component information about the facility where the error has occurred, error occurrence time, and number of errors, and update information about the error list, through the error log list and alarm service platform 10.

The execution terminal 200 may edit and output the error log in a preset file format (S730).

The execution terminal 200 may receive the error weight, resultant from analyzing the correlation between error items in the error list and indicated as high, medium, and low, and receive the maintenance period adjusted by analyzing error types and error frequencies according to the error weights and the number of errors.

According to an embodiment, use of the error log list and alarm service platform 10 and the system supporting the same enables real-time provision of an alarm message to the user, allowing for a quick response to any error or issue occurring in the machine facility.

Further, the embodiment of the disclosure may store and analyze the error list to thereby calculate a proper maintenance period and easily grasp the type of error, frequency of each type of error, and the type of error for each period.

The embodiment of the disclosure may also classify errors of interest and errors of no interest, selectively providing or receiving the presence or absence of only errors designated by the user.

Figure 9:
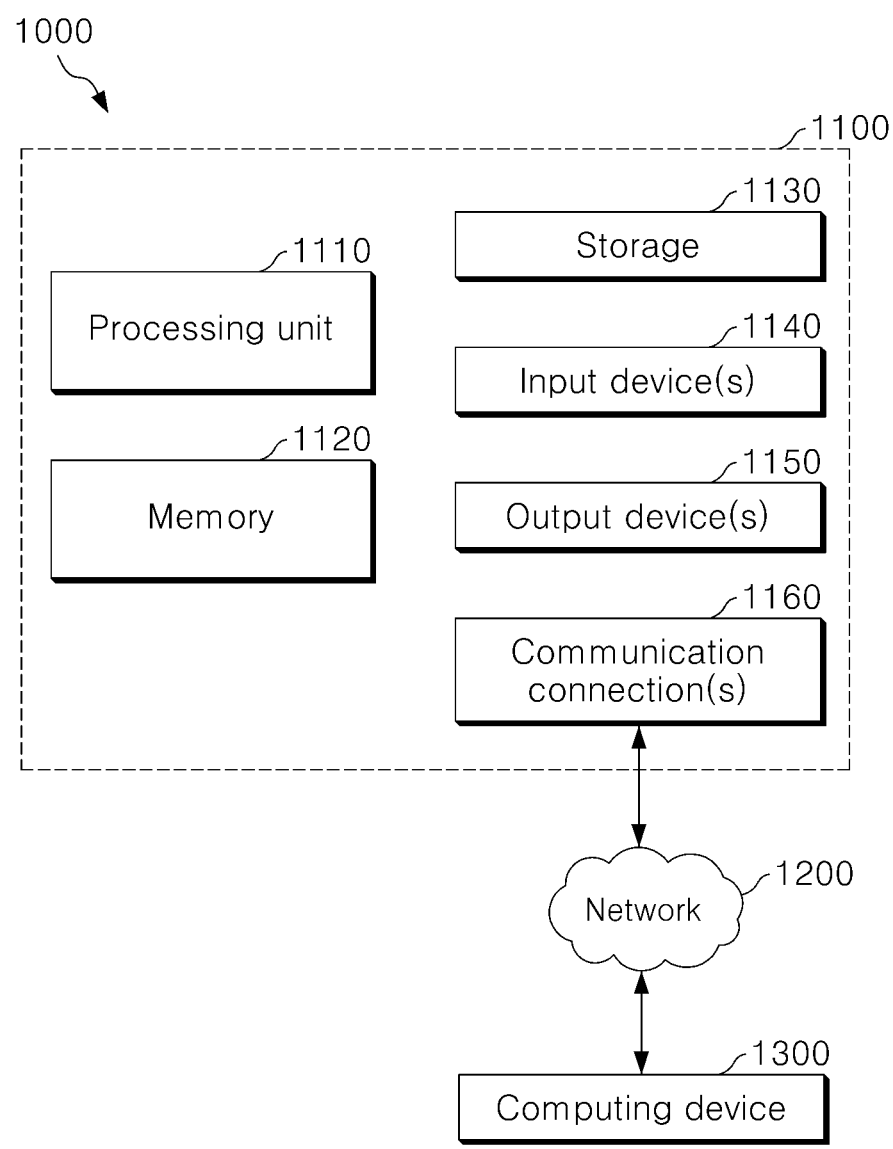
FIG. 9 is a view illustrating an example computing environment according to an embodiment.

FIG. 9 is a view illustrating an example computing environment in which one or more embodiments of the disclosure may be implemented. FIG. 3 illustrates an example system 1000 including a computing device 1100 configured to implement one or more embodiments as described above. For example, the computing device 1100 may include, but is not limited to, at least one of personal computers, servers, handheld or laptop devices, mobile devices (e.g., mobile phones, personal digital assistances (PDAs), or media players), multi-processor systems, consumer electronic devices, mini computers, main frame computers, or a distributed computing environment including any of the above-described systems or devices.

The computing device 1100 may include at least one processing unit 1110 and at least one memory 1120. The processing unit 1110 may include, e.g., a central processing unit (CPU), a graphic processing unit (GPU), a microprocessor, an application specific integrated circuit (ASIC), or field programmable gate arrays (FPGA). The processing unit may have a plurality of cores. The memory 1120 may be a volatile memory (e.g., a random access memory (RAM), a non-volatile memory (e.g., a read-only memory (ROM) or flash memory), or a combination thereof. The computing device 1100 may include additional storage 1130. The storage 1130 includes, but is not limited to, magnetic storage or optical storage. The storage 1130 may store computer-readable commands (or instructions) to implement one or more embodiments as described above and may further store other computer-readable commands (or instructions) to implement an operating system (OS) or application programs. The computer-readable commands (or instructions) stored in the storage 1130 may be loaded onto the memory 1120 to be executed by the processing unit 1110.

The computing device 1100 may include at least one input device 1140 and at least one output device 1150. The input devices 1140 may include, e.g., a keyboard, a mouse, a pen, a voice input device, a touch input device, an infrared (IR) camera, a video input device, or any other various input devices. The output devices 1150 may include, e.g., one or more displays, speakers, printers, or any other output devices. The computing device 1100 may use an input device or output device provided in another computing device as the input device 1140 or the output device 1150. The computing device 1100 may include at least one communication connection 1160 to enable the computing device 1100 to communicate with other devices (e.g., the computing device 1300). The communication connections 1160 may include a modem, a network interface card (NIC), an integrated network interface, a radio frequency transmitter/receiver, an IR port, a universal serial bus (USB) connection, or other interfaces to connect the computing device 1100 with other computing devices. The communication connections 1160 may include wired connections or wireless connections. The above-described components of the computing device 1100 may be connected by various interconnects (e.g., peripheral component interconnect (PCI), USB, firmware (IEEE1394), or optical bus architecture), such as a bus, and may be interconnected by the network 1200. As used herein, the terms "component" and "system" may generally denote hardware, a combination of hardware and software, software, or computer-related entities which are software in execution.

It will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. It should be noted that the scope of the disclosure is defined by the appended claims rather than the described description of the embodiments and include all modifications or changes made to the claims or equivalents of the claims.

What is claimed is:

1. An error log list and alarm service system, comprising:
an execution terminal receiving an alarm including error information according to an operation error in a machine facility designated through an error log list and alarm service platform; and
a monitoring server collecting a result of monitoring an operation state and an operation error in the machine facility, extracting the error information according to an information setting value set by the execution terminal, and providing the extracted error information through a web or app platform, wherein the monitoring server, when an interval between an nth error occurrence time and an n+1th error occurrence time is two times or more shorter than an interval between an n−1th error occurrence time and the nth error occurrence time, sends an emergency alarm message to the execution terminal or a terminal designated by a manager.

2. The error log list and alarm service system of claim 1, further comprising a measuring module collecting state information and environment information according to operation of components from a programmable logic controller (PLC) interworking with or included in the machine facility and transmitting the collected information to the monitoring server.

3. The error log list and alarm service system of claim 2, wherein the monitoring server provides the execution terminal with an error list including a facility number of the machine facility equipped with the measuring module, component information about the machine facility with an error, and a number of errors, and a piece of update information about the error list.

4. The error log list and alarm service system of claim 3, wherein the monitoring server, when the error information included in the error list matches the information setting value set by the execution terminal, sends an alarm message to the execution terminal or a terminal designated by a manager.

5. The error log list and alarm service system of claim 4, wherein the monitoring server analyzes a correlation between error items in the error list, displays an error weight as high, medium, and low, analyzes an error type and an error frequency according to the error weight and the number of errors to adjust a maintenance time, and provides an analysis result to the execution terminal.

6. The error log list and alarm service system of claim 3, wherein the monitoring server provides information obtained by treating an error occurrence time and number of errors in the machine facility with the error, with a log function and a fractal dimension function.

7. The error log list and alarm service system of claim 1, wherein the error log list and alarm service platform includes:
- an interface for designating at least one machine facility to be monitored for an error, log, or possibility;
- an interface for setting an error occurrence range for each of the at least one machine facility;
- an interface for setting to send an alarm message at a designated number when a designated machine facility meets the error occurrence range;
- an interface for displaying an error log of the at least one machine facility through an error occurrence time and number of errors through a log function and a fractal dimension function; and
- an interface for editing and outputting the error log in a preset file format.

8. A error log list and alarm service system, comprising:
- an execution terminal receiving an alarm including error information according to an operation error in a machine facility designated through an error log list and alarm service platform; and
- a monitoring server collecting a result of monitoring an operation state and an operation error in the machine facility, extracting the error information according to an information setting value set by the execution terminal, and providing the extracted error information through a web or app platform, wherein the monitoring server, if an operation error occurs in a first component or a first machine facility, analyzes an operation state of at least one second component or second machine facility associated with the operation of the first component or first machine facility, analyzes an operation period during which the second component or second machine facility operates slow or fast in the operation state to thereby analyze causality with the operation error in the first component or first machine facility.

* * * * *